United States Patent
Kado

(10) Patent No.: US 11,770,483 B2
(45) Date of Patent: Sep. 26, 2023

(54) INFORMATION PROCESSING APPARATUS THAT DISPLAYS DIFFERENT SOFT KEYS BASED ON JOB STATUS, METHOD OF CONTROLLING INFORMATION PROCESSING APPARATUS, AND NON-TRANSITORY STORAGE MEDIUM

(71) Applicant: CANON KABUSHIKI KAISHA, Tokyo (JP)

(72) Inventor: Kazuki Kado, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/891,584

(22) Filed: Aug. 19, 2022

(65) Prior Publication Data

US 2023/0063589 A1 Mar. 2, 2023

(30) Foreign Application Priority Data

Sep. 2, 2021 (JP) ................. 2021-142902

(51) Int. Cl.
*H04N 1/00* (2006.01)
*H04N 1/44* (2006.01)

(52) U.S. Cl.
CPC ..... *H04N 1/00411* (2013.01); *H04N 1/00477* (2013.01); *H04N 1/4433* (2013.01)

(58) Field of Classification Search
None
See application file for complete search history.

(56) References Cited

U.S. PATENT DOCUMENTS

| | | | |
|---|---|---|---|
| 2014/0123023 A1* | 5/2014 | Suzuki | H04N 1/00509 715/750 |
| 2016/0188263 A1* | 6/2016 | Sueishi | G06F 3/1253 358/1.15 |
| 2018/0068345 A1* | 3/2018 | Hirokawa | H04N 1/00482 |
| 2019/0281175 A1* | 9/2019 | Shibata | H04N 1/00503 |
| 2020/0034097 A1* | 1/2020 | Omori | G06F 3/1273 |
| 2020/0084327 A1* | 3/2020 | Inoue | H04N 1/00482 |
| 2020/0128144 A1* | 4/2020 | Kodama | H04N 1/00411 |
| 2020/0296238 A1* | 9/2020 | Nishiyama | H04N 1/00503 |
| 2021/0006677 A1* | 1/2021 | Ushinohama | H04N 1/00474 |

FOREIGN PATENT DOCUMENTS

JP 2020004232 A 1/2020

* cited by examiner

*Primary Examiner* — Henok Shiferaw
(74) *Attorney, Agent, or Firm* — ROSSI, KIMMS & McDOWELL LLP

(57) ABSTRACT

According to the prior art, it is necessary to display necessary buttons depending on situations if a button for instructing stop/restart of a job common in multiple functions is displayed on a screen. According to an aspect of the present disclosure, an information processing apparatus comprises: a memory; and at least one processor in communication with the memory and configured to perform: displaying a display screen on an operation unit, the display screen including a display area of an application and a common display area containing a plurality of buttons commonly used in each application; and controlling of changing a button to be displayed in the common display area depending on a job status.

16 Claims, 17 Drawing Sheets

FIG. 7

| | APPLICATION | USER | DATE & TIME OF EXECUTION | STATUS OF JOB |
|---|---|---|---|---|
| 1 | COPY | USER A | xxxx/xx/xx | IN PROCESS |
| 2 | SCAN AND SEND | USER A | xxxx/xx/xx | SUSPENDED |
| 3 | COPY | USER B | xxxx/xx/xx | SUSPENDED |
| 4 | PRINT | USER C | xxxx/xx/xx | SUSPENDED |

700

600

FIG. 12
1200A 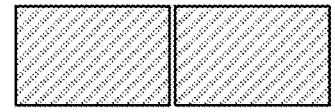
1200B 
1200C 
1200D 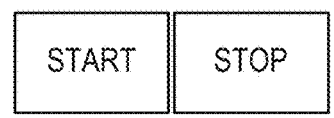
1200E 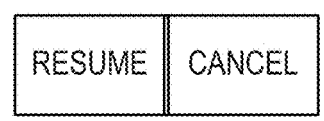
1200F 

INFORMATION PROCESSING APPARATUS THAT DISPLAYS DIFFERENT SOFT KEYS BASED ON JOB STATUS, METHOD OF CONTROLLING INFORMATION PROCESSING APPARATUS, AND NON-TRANSITORY STORAGE MEDIUM

BACKGROUND

Field

The present invention relates to an information processing apparatus, a method of controlling the information processing apparatus, and a non-transitory storage medium.

Description of the Related Art

In today's widely used image forming apparatuses such as copiers, printers, and faxes, it is possible to execute a job or suspension by pressing a start key or a stop key provided by a hard key.

In recent years, image forming apparatuses without hard keys have also become popular. In such an image forming apparatus, a soft key corresponding to a hard key such as a start key or a stop key is fixedly displayed in a common display area of an operation panel. These soft keys are displayed in common even in different application screens. Japanese Patent Application Laid-Open No. 2020-4232 discloses a method for displaying a start key as a soft key on a screen and controlling the display position.

However, when the soft key corresponding to the hard key is fixedly displayed in the common display area as in the past, the usability may be deteriorated. If a large number of soft keys are displayed in a fixed manner, the user may be confused by key operation, and if the number of soft keys to be displayed in a fixed manner is limited to a small number, the user may not display the desired soft key. In addition, the required soft key varies depending on the state of the image forming apparatus or the like.

An object of the present invention is to provide a display method that does not degrade usability even when a soft key is displayed in a common display area.

SUMMARY

According to an aspect of the present disclosure, an information processing apparatus comprises: a memory; and at least one processor in communication with the memory and configured to perform: displaying a display screen on an operation unit, the display screen including a display area of an application and a common display area containing a plurality of buttons commonly used in each application; and controlling of changing a button to be displayed in the common display area depending on a job status.

Further features of the present invention will become apparent from the following description of exemplary embodiments with reference to the attached drawings.

BRIEF DESCRIPTION OF THE DRAWINGS

FIG. 7 shows a list of the job management information according to the embodiment of the present disclosure.

FIG. 12 shows an example of displaying the buttons according to the embodiment of the present disclosure.

DESCRIPTION OF THE EMBODIMENTS

First Embodiment

The embodiments of the present invention will now be described with reference to the drawings.

[Configuration of MFP 100]

Figure 1:
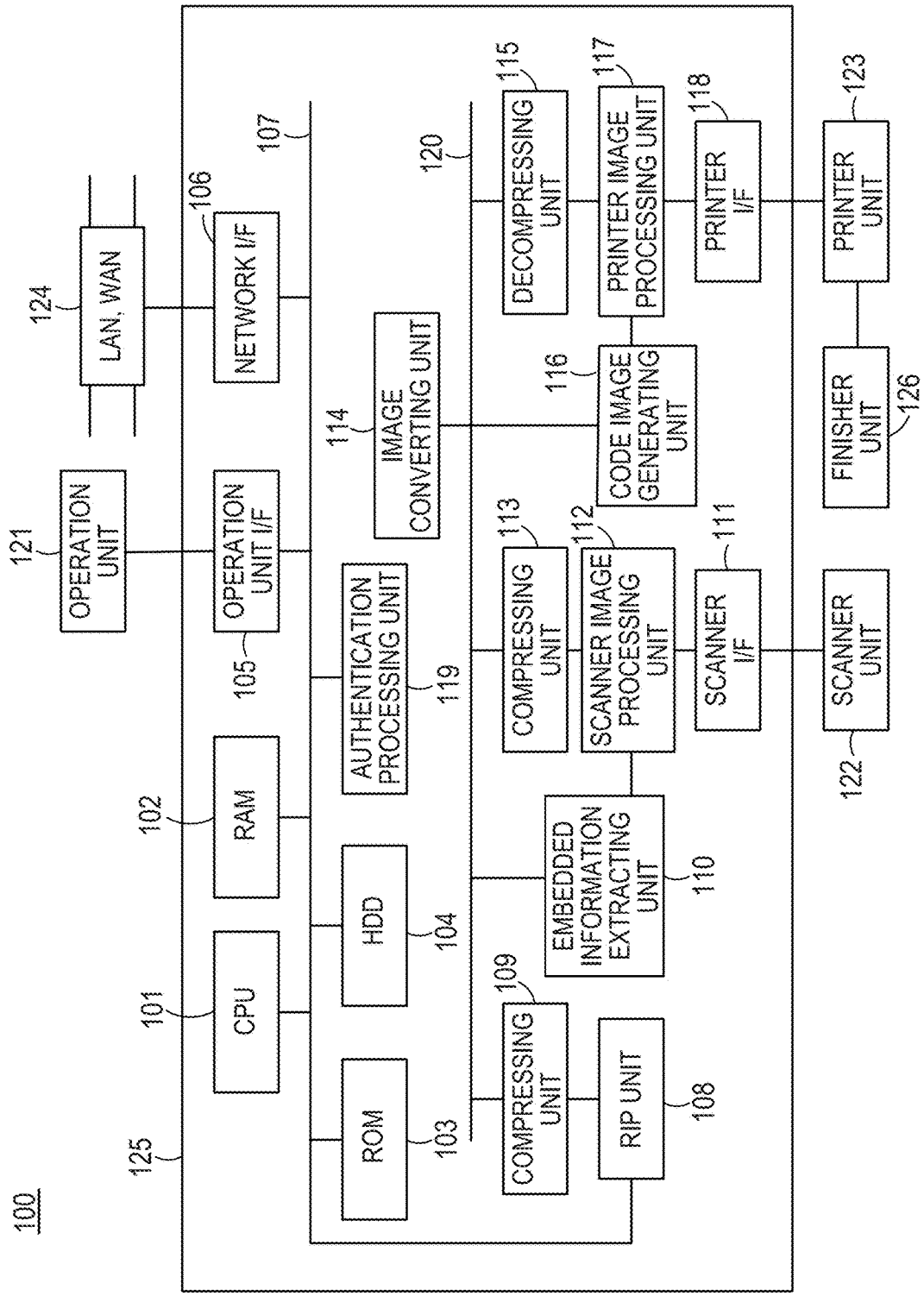
FIG. 1 is a diagram showing an example of the hardware configuration of the MFP controller according to the embodiment of the present disclosure.

FIG. 1 is a block diagram showing a schematic configuration of an MFP (Multi-Function Peripheral) 100 which is an information processing apparatus according to the first embodiment of the present disclosure.

A CPU 101 controls access to various devices connected to a system bus 107 in accordance with a control program stored in a ROM 103 or an HDD 104, and also controls various processes performed inside a controller 125. A RAM 102 is a system work memory used of the operation of the CPU 101 and is also a memory for temporarily storing image data. The ROM 103 stores a boot program of devices. The HDD 104 is a hard disk drive and stores system software and image data.

An operation unit I/F 105 is an interface unit for connecting the system bus 107 and an operation unit 121. The operation unit I/F 105 receives the image data to be displayed on the operation unit 121 from the system bus 107 and outputs the image data to the operation unit 121, and outputs the information input from the operation unit 121 to the system bus 107.

A network I/F 106 connects a LAN, a WAN 124 and the system bus 107, and exchanges data with other devices in both directions.

An image bus 120 is a transmission path for exchanging image data and is composed using a PCI bus or IEEE 1394.

A scanner image processing unit 112 corrects, processes, and edits the image data received from a scanner unit 122 via a scanner I/F 111. An embedded information extraction unit 110 detects a pattern embedded in a background image from the image data and extracts additional information.

A compression unit 113 receives image data from the scanner image processing unit 112 and compresses the data. A decompression unit 115 decompresses the compressed data, then performs the raster expansion, and then sends the data to a printer image processing unit 117.

The printer image processing unit 117 receives the image data sent from the decompression unit 115 and performs image processing to the image data while referring to the attribute data attached to the image data. If receiving an instruction, the code image data generated in a code image generating unit 116 is combined with the image data. The code image generating unit 116 generates code image data such as a two-dimensional code image, a barcode image, and an image generated by an information embedding technique. The code image is generated by executing a program stored in the RAM 102. The image data after the image processing is output to a printer unit 123 via a printer I/F 118.

An image conversion unit 114 performs predetermined conversion processing on the image data such as rotation, color space conversion, conversion between binary and multi-value, image composition, and thinning.

A RIP unit 108 receives intermediate data generated based on PDL code data and generates bit map data (multi-value). The generated bitmap data is compressed by a compression unit 109 and sent to the image bus 120.

An authentication processing unit 119 uses user information inputted in the operation unit 121 to authenticate a print job, a user, and a workgroup. The authentication processing unit 119 also manages information about authenticated users and authenticated workgroups.

A finisher unit 126 performs various post-processing such as staple processing, punching processing and sorting on a sheaf of sheets ejected from the printer unit 123.

[Configurations of Printer Unit and Scanner Unit]

Figure 2:
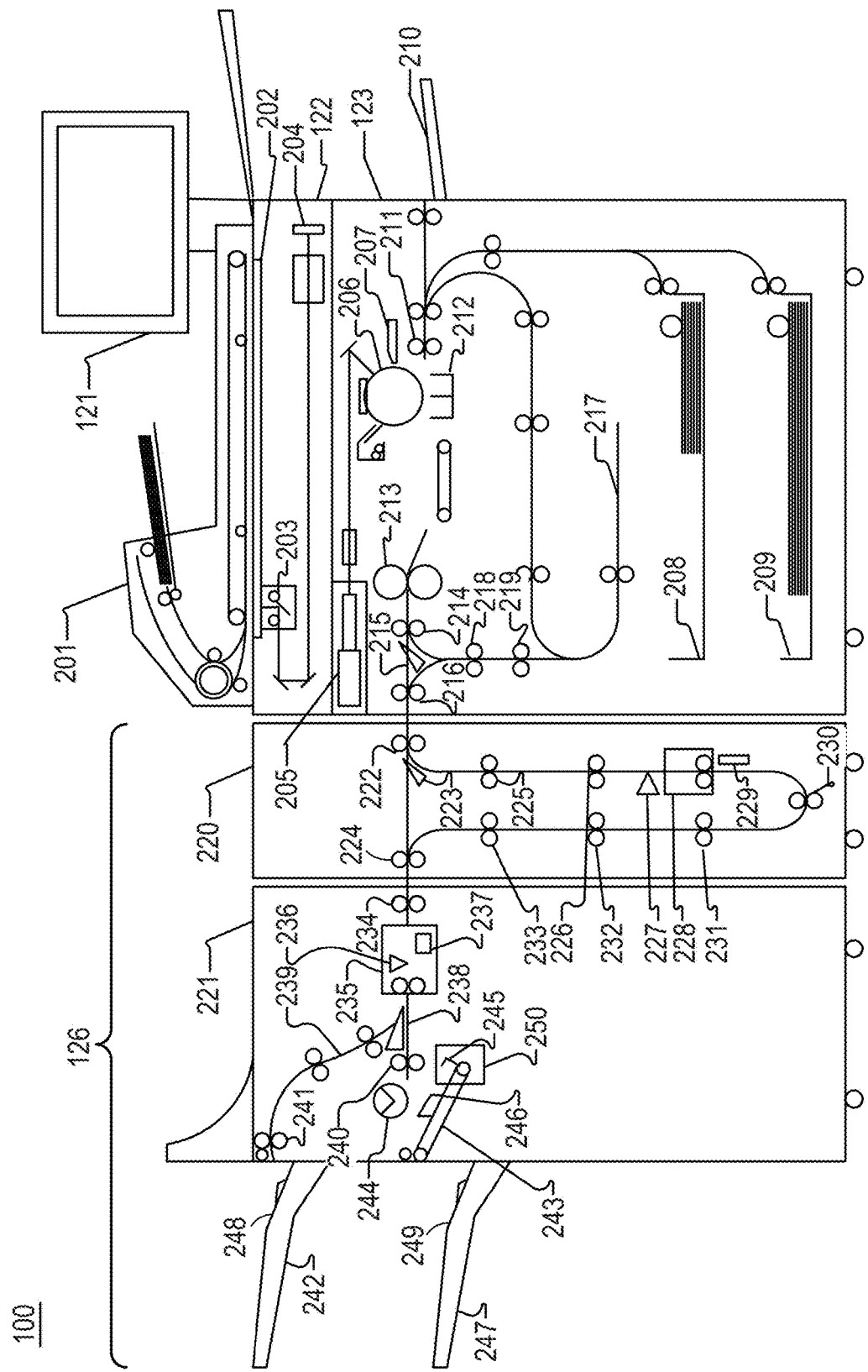
FIG. 2 is a diagram showing the vertical section of the hardware of the MFP according to the embodiment of the present disclosure.

FIG. 2 is a sectional diagram showing the internal structure of the MFP 100, which is the information processing apparatus shown in FIG. 1, and the same reference numerals are assigned to the same components shown in FIG. 1. As shown in FIG. 2, the MFP 100 includes the scanner unit 122, the printer unit 123, the finisher unit 126, and the operation unit 121. Here, the scanner unit 122 and the printer unit 123 are integrally formed. The finisher unit 126 is detachably configured to the printer unit 123.

An automatic document feeder (ADF) 201 is mounted on the scanner unit 122. The ADF 201 feeds sheets set upwardly on a sheet tray one by one in the left direction from the first page, and conveys the sheets to a predetermined position on a platen glass 202 through a curved path. The sheet conveyed to the predetermined position on the platen glass 202 is scanned from the left to the right by a scanner unit 203, and an image on the sheet is read. When the scanner unit 203 scans a sheet, the surface to be read of the sheet is irradiated with light of a lamp of the scanner unit 203, and reflected light from the sheet is guided to a lens through a mirror. The light passing through the lens is formed as an optical image on an imaging surface of an image sensor 204. The optical image is converted into image data by the image sensor 204 and output from the image sensor 204. The image data output from the image sensor 204 is input as a video signal to an exposure control unit 205 of the printer unit 123 after predetermined processing is performed in the scanner image processing unit 112.

A case where an image is formed on one side of the sheet will be described below.

The exposure control unit 205 of the printer unit 123 modulates and outputs a laser beam based on the inputted video signal, and the laser beam is irradiated on a photosensitive drum 206 while being scanned by a polygon mirror (not shown) or the like. An electrostatic latent image corresponding to the scanned laser beam is formed on the photosensitive drum 206.

The electrostatic latent image on the photosensitive drum 206 is visualized as a developer image by a developer supplied from a developing unit 207. Sheets are fed from each of cassettes 208, 209 or a manual feed tray 210. The sheet fed is temporarily stopped by abutting a front end of the sheet against a resist roller 211, and then conveyed between the photosensitive drum 206 and a transfer unit 212 at a timing synchronized with the start of irradiation of the laser beam. Abutting the front end of the sheet fed against the resist roller 211 and temporarily stopping the sheet allows to correct the skew of the sheet.

Next, the developer image formed on the photosensitive drum 206 is transferred onto the sheet fed by the transfer unit 212. The sheet on which the developer image has been transferred is conveyed to a fixing unit 213. The fixing unit 213 fixes the developer image on the sheet by thermocompression bonding. The sheet having passed through the fixing unit 213 is conveyed by a conveying roller 214 toward a flapper 215, and is conveyed by the flapper 215 toward a discharge roller 216. The sheet is discharged from the printer unit 123 to the finisher unit 126 via the discharge roller 216. At this time, the sheet is discharged in a face-up state.

It is also possible to discharge the sheet to the finisher unit 126 in a face-down state. If the face-down discharge is performed, the flapper 215 is switched to lead the sheet passing through the fixing unit 213 to a reverse conveyance path 217, and the sheet is conveyed into the reverse conveyance path 217 by conveyance rollers 218 and 219 through the flapper 215. The sheet conveyed to the reverse conveyance path 217 is switched back, thereby reversing the front and back sides of the sheet. The sheet whose front and rear sides are inverted is discharged from the printer unit 123 to the finisher unit 126 via the discharge roller 216.

[Configuration of Finisher]

The finisher unit 126 has a first punch unit 220 and a staple stacker unit 221, and various post-processing such as staple processing, punch processing and sorting can be performed by using the first punch unit 220 and the staple stacker unit 221 on a sheaf of sheets.

The first punch unit 220 performs a multi-hole punching process. The first punch unit 220 has an entrance conveyance roller 222 for receiving a sheet discharged from the printer unit 123 into the first punch unit 220. The sheet conveyed into the first punch unit 220 is conveyed toward a discharge roller 224 or toward a conveying roller 225 according to the switching operation of a flapper 223. Here, if the sheet is conveyed to the discharge roller 224 by the flapper 223, the sheet is conveyed directly to the staple stacker unit 221 through the first punch unit 220. If the sheet is conveyed to the conveying roller 225 by the flapper 223, the sheet is punched with multiple holes.

A conveying roller 226, a sensor 227, a punch unit 228, and an abutment plate 229 are provided downstream of the conveying roller 225. The sensor 227 detects the front end of the sheet. The punch unit 228 performs a multi-hole punching process for making a large number of holes (e.g., 30 holes), in the front end (a part to be an end in the sheet conveying direction). The abutment plate 229 is normally positioned to open the sheet conveying path. The abutment plate 229 is rotated in $\pi/2$ (rad) angle at a predetermined timing, and protrudes onto the sheet conveyance path to be butted against the tip (front end). By abutting the sheet tip against the abutment plate 229, the sheet can be positioned with respect to the punch unit 228 with a predetermined accuracy.

Each conveyance roller 230 to 233 is provided on the downstream side of the abutment plate 229, and a conveyance path for guiding the sheet to the discharge roller 224 is formed by each conveyance roller 230 to 233.

The staple stacker unit 221 has an entrance roller 234 for receiving a sheet discharged from the first punch unit 220 into the staple stacker unit 221. The sheet conveyed into the staple stacker unit 221 through the entrance roller 234 is guided to a second punch unit 235.

The second punch unit 235 performs a few holes punching process in which a small number of holes (e.g., 2 to 4 holes) are punched in a sheet rear end (an end portion in the sheet conveying direction) if the few holes punching process is set. In addition, the second punch unit 235 passes the sheet through to convey the sheet to the downstream side if the few holes punching process is not set. The second punch unit 235 is provided with a sensor 236 for detecting the rear end of the sheet and an abutment plate 237 against which the rear end of the sheet is abutted.

If the second punch unit 235 performs the few holes punching process, the conveying roller in the second punch unit 235 is reversed at a predetermined timing after the sensor 236 detects the rear end of the sheet. Further, the abutment plate 237 is rotated in $\pi/2$ (rad) angle, and protrudes onto the conveyance path. Then, the sheet is switched back toward the abutment plate 237, and stopped while the rear end of the sheet is abutted against the abutment plate 237. In such a state that the sheet is positioned with respect to the rear end, a few holes are formed in the rear end of the sheet. Thereafter, the sheet is conveyed toward a flapper 238 by the conveying roller.

The flapper 238 switches to lead the sheet to a non-sort path 239 or a conveying roller 240. Here, if the post-processing such as sorting, punching, and staple processing is not set and the sheet is discharged as it is, the sheet is guided to the non-sort path 239 by the flapper 238. The sheet guided to the non-sort path 239 is discharged to a stack tray 242 by a conveying roller 241.

If the post-processing such as sorting or staple is set for the sheet, the printer unit 123 ejects the sheet to the finisher unit 126 in a face-down state. The sheet carried into the finisher unit 126 is conveyed to the staple stacker unit 221 through the first punch unit 220, and then guided to the conveying roller 240 by the flapper 238. Then, the sheet is discharged onto a sheaf discharge belt 243 by the conveying roller 240. Here, a low friction intermediate treatment tray (not shown) is provided at a position several millimeters higher in parallel with the sheaf discharge belt 243, and the sheet is actually discharged onto the intermediate treatment tray. The ejected sheet falls down to the right due to its own weight along the intermediate treatment tray (sheaf discharge belt 243). Further, a fan-shaped return roller 244 rotates counterclockwise, and the friction member provided at the outer edge of the fan-shaped return roller 244 abuts on the sheet. The contact of the friction member causes a force to drop the sheet in the right-downward direction, and the end of the sheet abuts against the stopper plate 245. Thus, the sheet is aligned in the longitudinal direction (feed direction).

On the intermediate treatment tray, matching plates 246 are provided, which are located on the front side and the back side, respectively. Each matching plate 246 is driven each time a sheet is discharged onto the intermediate treatment tray. Thus, the sheet on the intermediate treatment tray is aligned in the lateral direction (width direction).

If a predetermined number of sheets are discharged and stacked on the intermediate treatment tray, the sheaf discharge belt 243 is driven, and the sheets are discharged onto the stack tray 242 or 247. If the staple mode is set, a sheaf of sheets for performing staple is discharged onto the intermediate treatment tray, and alignment of the sheets in the lateral direction is performed by the alignment plate 246. Thereafter, a staple unit 250 is driven to bind the sheaf, and the bound sheaf is discharged onto the stack tray 242 or 247 by the sheaf discharge belt 243. Here, the stack trays 242 and 247 are configured to be movable upward and downward. The stack trays 242 and 247 are provided with sensors 248 and 249 for detecting the presence or absence of sheets. According to the setting shown in FIG. 2, the stack tray 242 is set to eject sheets for which the post-processing is not set.

In addition, the staple unit 250 can perform "corner binding" for binding the back side position of the rear end of the sheet and "double binding" for binding the rear end of the sheet at two positions. The binding positions for the sheet are set by the user.

[Configuration of the Operation Unit]

Figure 3:
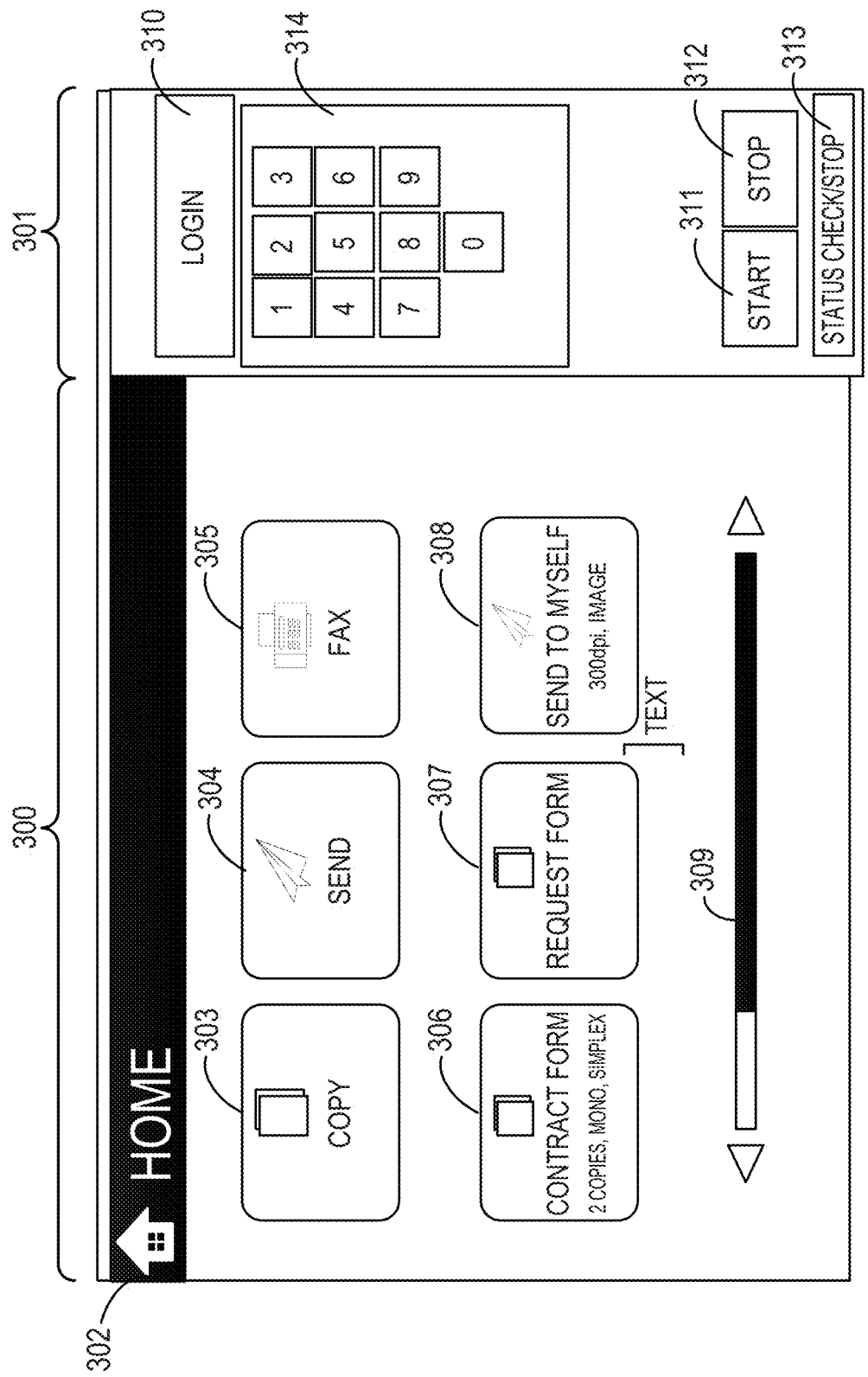
FIG. 3 shows an example of the display screen of the operation unit according to the embodiment of the present disclosure.

FIG. 3 depicts an example of a display screen of the operation unit 121 shown in FIG. 1. The display screen is divided into an application display area 300 and a common button display area 301. Various functions of the information processing apparatus are realized by the CPU 101 executing each application.

The application display area 300 is an area where a running application displays a screen, and can display, for example, a home screen 302 as a portal for starting up each application.

(Home Screen)

The home screen 302 has application buttons 303 to 308 for starting up applications. For example, if the copy button 303 is pressed, a copy application is started up and the screen switches to a copy screen 401 shown in FIG. 4. A slider bar 309 indicates that the home screen 302 can be changed by sliding. Further, by sliding the slider bar, pressing the arrows at both ends of the bar, or flicking the home screen 302, the CPU 101 receives an input, calls up application buttons registered in the next area from the HDD 104, and displays the application buttons.

The common button display area 301 is an area where buttons commonly used in each application are displayed. The same common button display area is displayed even in running different applications. The buttons commonly used include, for example, a login button 310, a start button 311, a stop button 312, a status check/stop button 313, and a numeric keypad button group 314. The common button display area 301 is an area where buttons commonly used in different applications are fixedly displayed. That is, the common button display area 301 is displayed in common in each application screen.

(Copy Screen)

Figure 4:
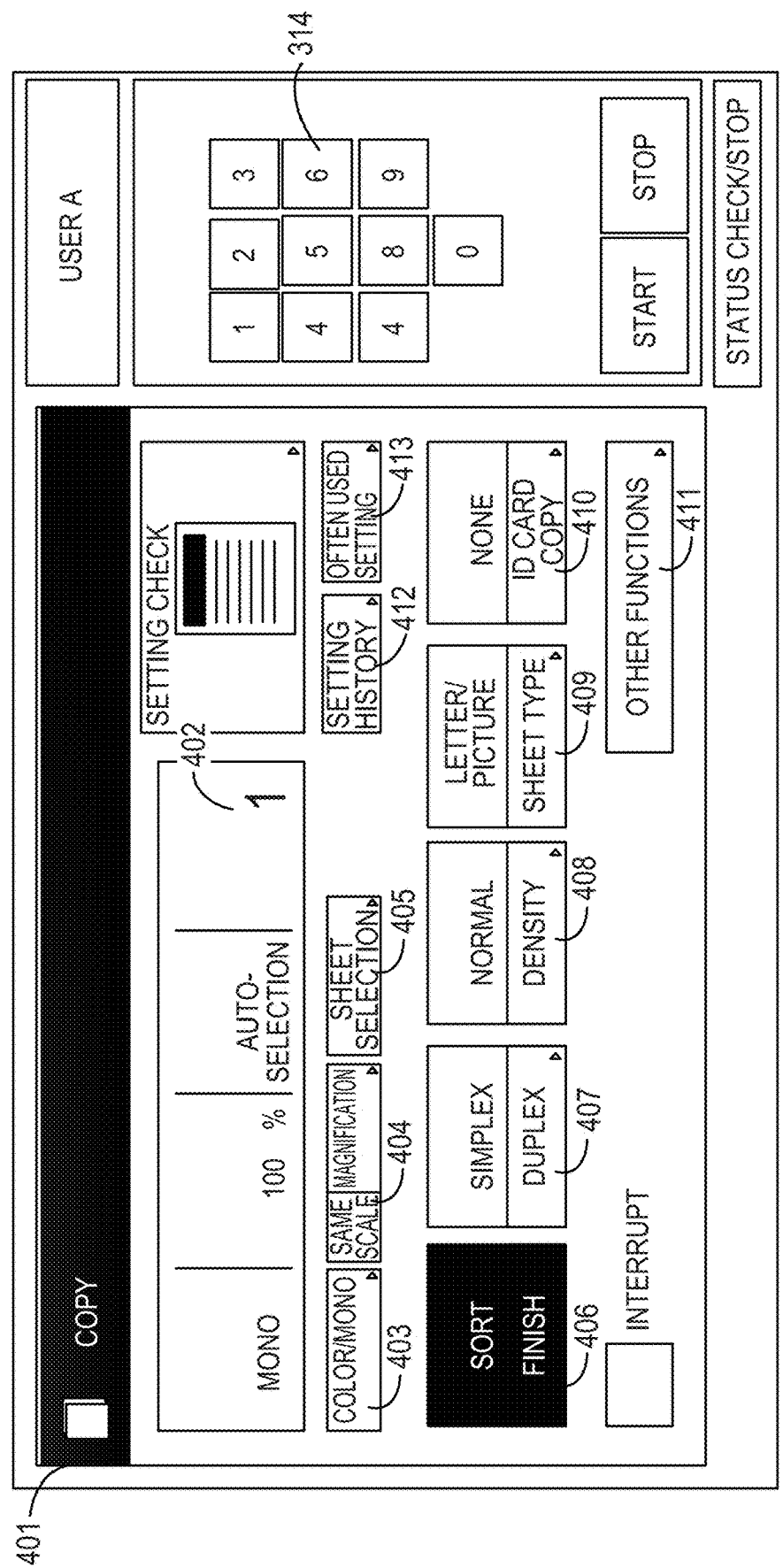
FIG. 4 shows an example of the copy screen according to the embodiment of the present disclosure.

FIG. 4 shows the copy screen 401 displayed in the application display area 300. By pressing the setting buttons 403 to 413, various copy functions are set. A number of copies is set by pressing the numeric keypad button group 314. The set number of copies is displayed in a copy number displaying area 402.

(Authentication Screen)

Figure 5:
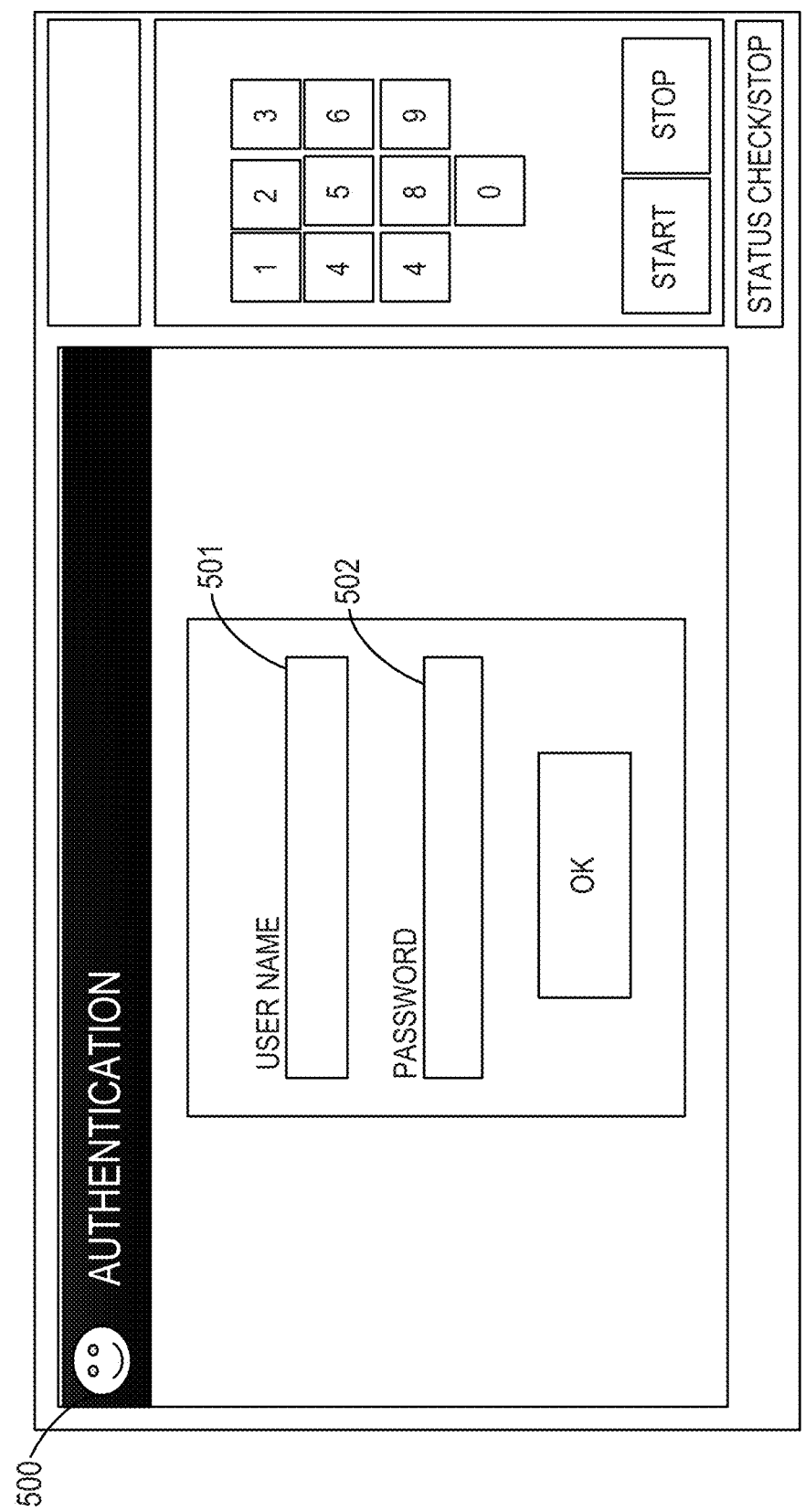
FIG. 5 shows an example of the authentication screen according to the embodiment of the present disclosure.

FIG. 5 is a diagram showing an authentication screen 500 displayed on the application display area 300 by pressing the login button 310 shown in FIG. 3. The authentication screen has an area for inputting a user name 501 and a password 502, and the controller 125 performs a login process by inquiring contents inputted to the authentication processing unit 119.

[Transition of Job Status]

Figure 6:
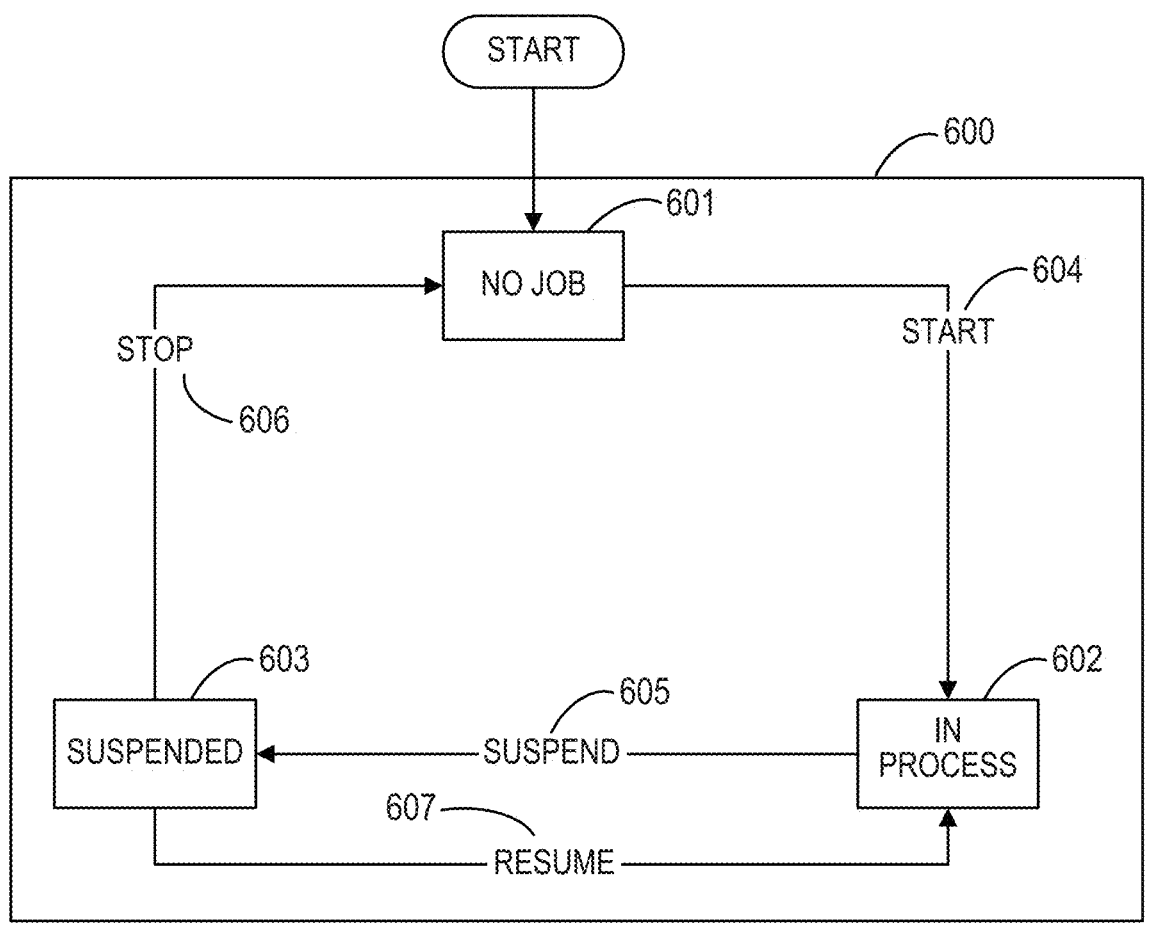
FIG. 6 is a diagram showing the state transition indicative of job status according to the embodiment of the present disclosure.

FIG. 6 is a diagram showing the transition of a job status 600. The job status 600 includes statuses of "no job 601", "job in process 602", and "job suspended 603", and the controller 125 stores the job status 600 in the ROM 103 or HDD 104. If a job start instruction 604 is issued by the controller 125, the job status shifts from the "no job 601" to the "job in process 602". Similarly, if a job suspension instruction 605 is executed, the job status shifts from the "job in process 602" to the "job suspended 603". If a job stop instruction 606 is executed, the job status shifts from the "job suspended 603" to the "no job 601". If a job restart instruction 607 is issued, the job status shifts from the "job suspended 603" to the "job in process 602".

The instructions of the job suspension instruction 605, the job stop instruction 606, and the job restart instruction 607 are executed by pressing the start button 311 or the stop button 312 displayed in the common button display area 301.

(Job Management Information)

FIG. 7 shows job management information 700 in which information about executed application names, users logged in on the authentication screen 500, date and time of the job executed, and the job status 600 are managed as a table. The job management information 700 is managed by the controller 125.

(Status Check Screen)

Figure 8:
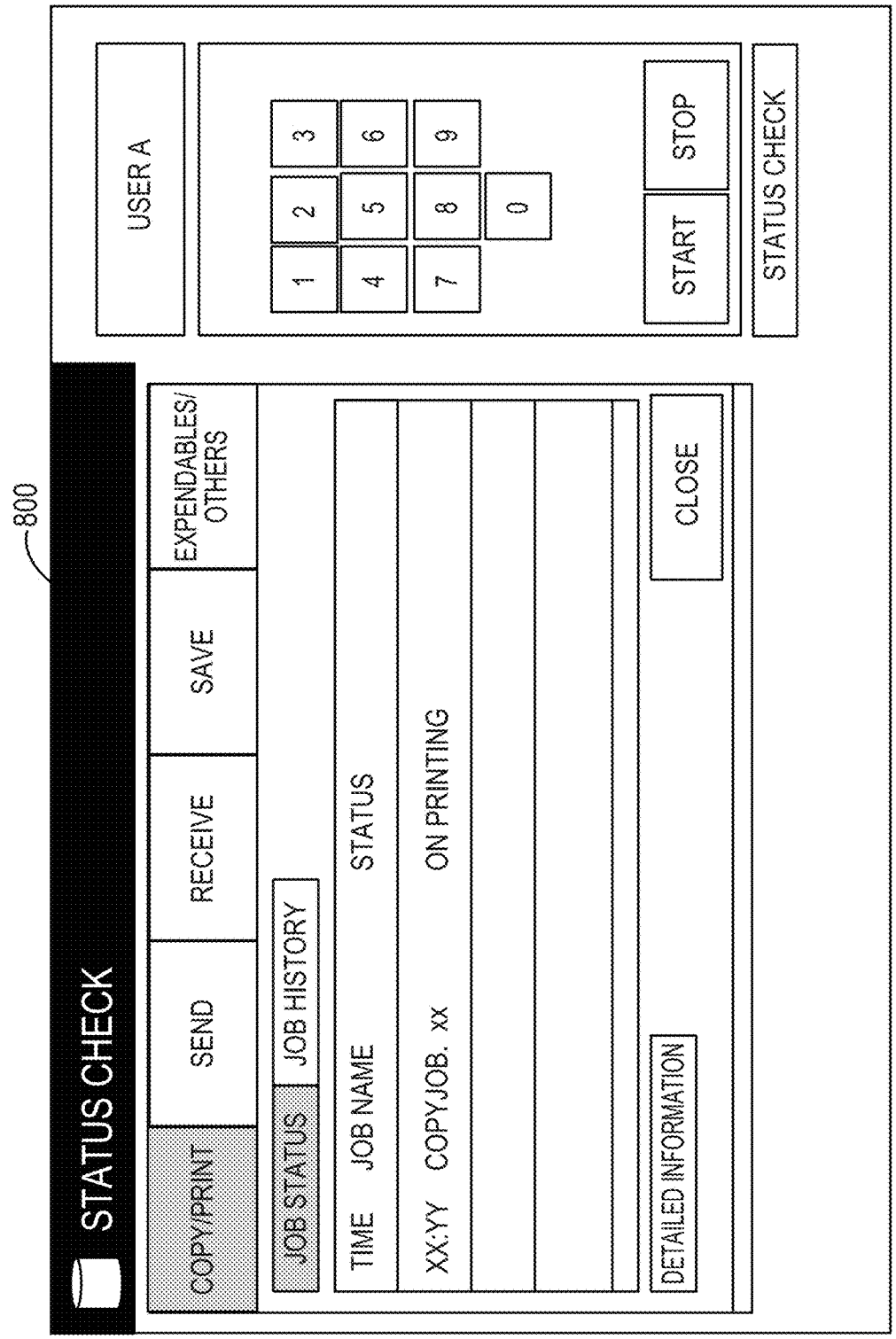
FIG. 8 is a diagram describing the status check screen according to the embodiment of the present disclosure.

FIG. 8 is a diagram showing a status check screen 800 of the MFP 100 displayed in the application display area 300 by pressing the status check/stop button 313. The status check screen 800 allows to check jobs currently executed by various applications and the remaining amounts of consumables.

[Display Control of Start Button and Stop Button]

Figure 9:
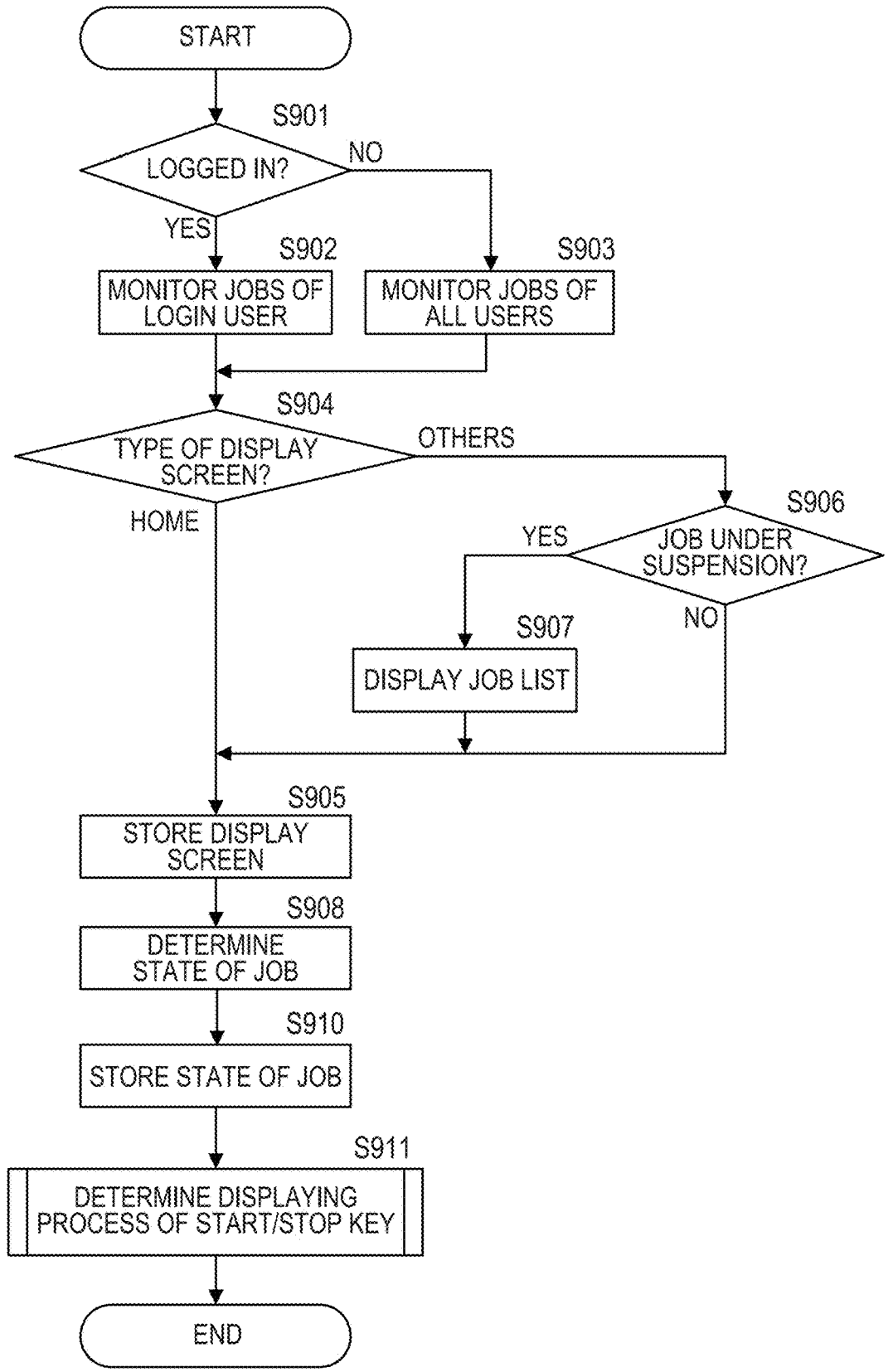
FIG. 9 is a flowchart describing the control for displaying the buttons according to the embodiment of the present disclosure.

FIG. 9 shows a flowchart for controlling the display of the start button 311 and the stop button 312 displayed in the common button display area 301 according to the present disclosure. The flowchart starts with a state of the MFP started up and the home screen 302 displayed. Symbols S901 to S910 denote each step, and these steps are realized by the CPU 101 of the MFP 100, which is an information processing apparatus, executing a program stored in the ROM 103 or the HDD 104.

In step S901, the CPU 101 of the controller 125 inquires the authentication processing unit 119 about the authentication state and determines whether or not the user has logged in. If it is determined that the user has logged in, the process proceeds to step S902, and if it is determined that the user has not logged in, the process proceeds to step S903.

In step S902, the CPU 101 monitors jobs of the logged-in user and proceeds to step S904.

On the other hand, in step S903, the CPU 101 monitors jobs of all users, and the process proceeds to step S904. Note that in the steps after step S904, only the job status of the logged-in user in the job management information 700 is monitored if step S904 is reached from step S902, and job statuses of all users are monitored if step S904 is reached from step S903.

Next, in step S904, the CPU 101 determines what is currently displayed on the display screen. If the display screen shows the home screen 302, the process proceeds to step S905. In any other cases, the process proceeds to step S906.

If the display screen shows the home screen 302, in step S905, the CPU 101 stores display screen information in the ROM 103 or the HDD 104.

In case of any other cases than the home screen, the CPU 101 determines whether the job status is in the "job suspended 603" in step S906. If the CPU 101 determines that the job status is in the "job suspended 603", the process proceeds to step S907. If the CPU 101 does not determine that the job status is in the "job suspended 603", the process proceeds to step S905. In the case of the "status check screen", a job list is displayed regardless of whether the job is in suspension or not.

Figure 10:
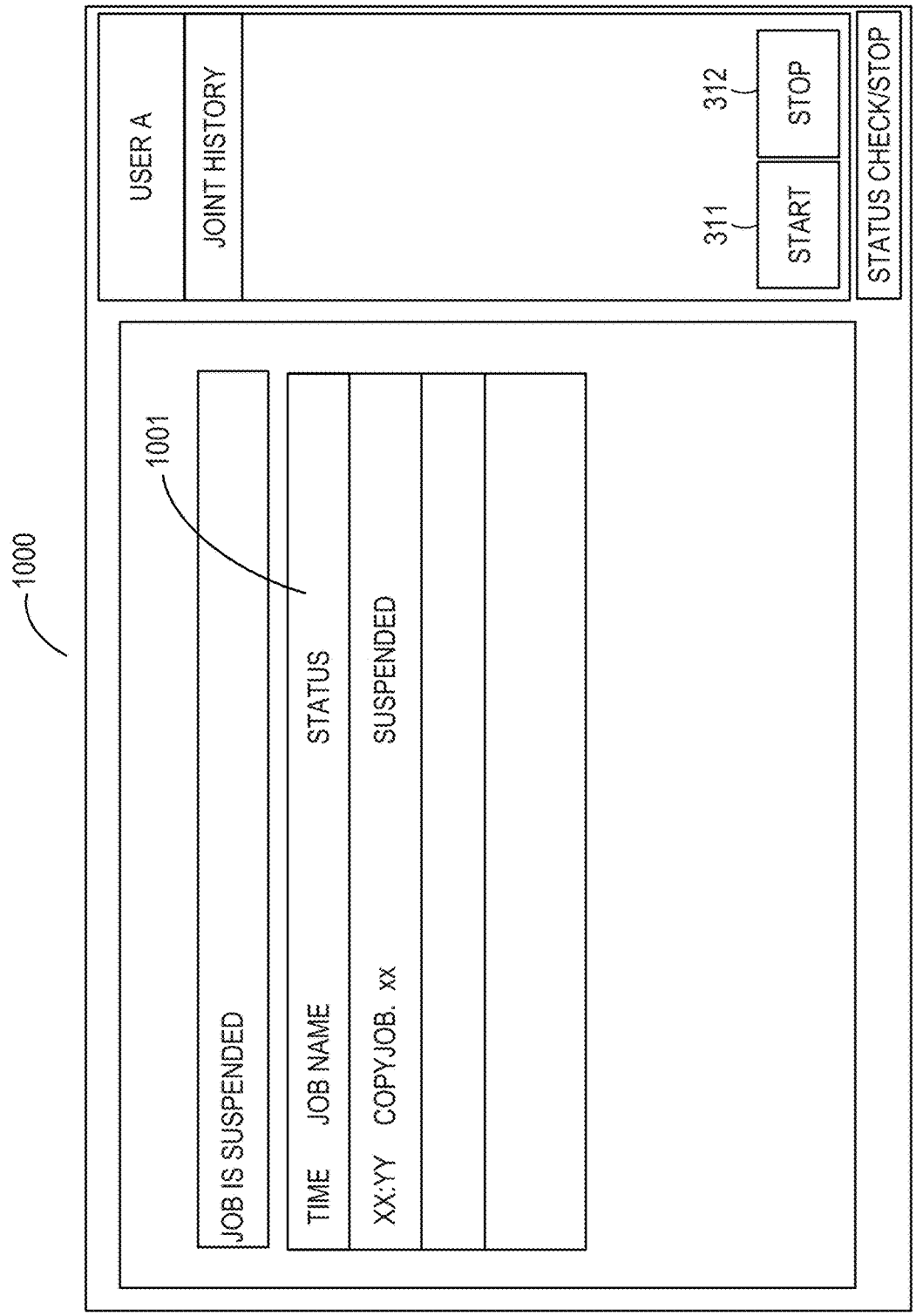
FIG. 10 shows an example of the screen when suspending a job according to the embodiment of the present disclosure.

In step S907, the CPU 101 displays a job suspension screen 1000 shown in FIG. 10. The job suspension screen 1000 includes a suspended job list 1001 and displays only jobs whose statuses 600 are in "the job suspended 603" from the job management information 700. If the screen transitions from the copy screen 401 of FIG. 4 to the job suspension screen 1000 by pressing the "stop" button, only the "copy job" is shown in the suspended job list 1001. The user can select an arbitrary job from the suspended job list 1001 to check detailed information or to instruct to restart the job.

In step S908, the CPU 101 determines whether the job status 600 is in the "no job 601", the "job in process 602", or the "job suspended 603".

In step S910, the job status 600 is stored in the ROM 103 or the HDD 104.

The CPU 101 executes the display processing of the start button 311 and the stop button 312 in a display determination subprocess S911 based on the display screen information stored in step S905 and the job status 600 stored in step S910.

[Display Determination Subprocess]

Figure 11:
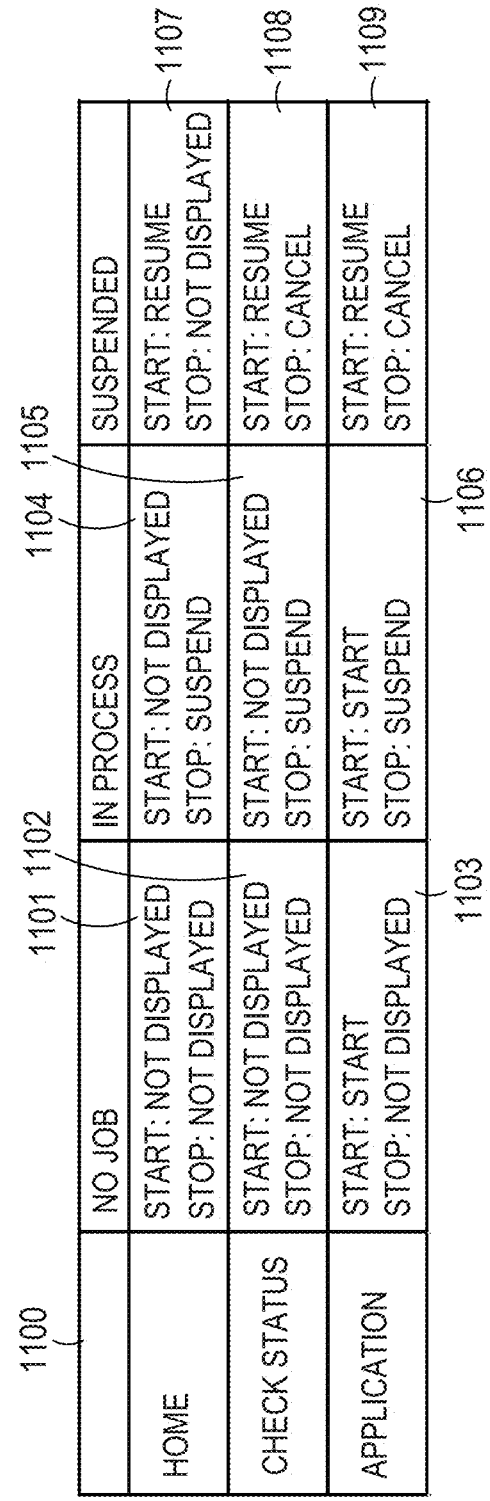
FIG. 11 is a table of the display determination subprocess according to the embodiment of the present disclosure.

FIG. 11 shows a table 1100 for determining display states 1101 to 1109 of the start button 311 and the stop button 312 from the display screen information and the job status information 600 in the display determination subprocess S911. The CPU 101 refers to the table 1100 and determines the buttons displayed in the common button display area 301 according to the state of the MFP 100. Here, the job status is shown as an example of the state of the MFP 100, but other statuses such as the occurrence of an error may be used. The start button and the stop button displayed in the common button display area 301 are shown as examples, but other buttons may be used.

In the subprocess step S911 of FIG. 9, a method for specifically determining the display states of the start button 311 and the stop button 312 is realized by performing a so-called table search in which the table 1100 is used in association with the current job status information 600. In addition to the table search method, the information of the job status may be determined by repeatedly performing the condition judgements. As a processing method, the display state of the buttons may be determined from the information of job status.

Example of Common Button Display Area

FIG. 12 shows specific examples 1200A to 1200F of the start button 311 and the stop button 312 displayed in the common button display area 301.

(Status of "No Job 601")

If the information of job status indicates the status of the "no job 601", there is no job to stop, so the stop button 312 is not displayed.

If the display screen information shows the copy screen 401, the start button 311 can issue the job start instruction 604. The start button 311 shows a word (e.g., "start") indicating that the job is to be started with contents set by the user. In the case where the display screen information shows other than the copy screen 401, the job start instruction 604 cannot be issued, and therefore, the start button 311 is not displayed.

The example 1200A of FIG. 12 corresponds to the display states 1101, 1102 of FIG. 11. The display state 1101 corresponds to the case of the information of the job status indicating the "no job 601" and the display screen information showing the home screen 302. The display state 1102 corresponds to the case of the information of the job status indicating the "no job 601" and the display screen information showing the status check screen 800. The example 1200B of FIG. 12 corresponds to the display state 1103 of FIG. 11. The display state 1103 corresponds to the case of the information of the job status indicating the "no job 601" and the display screen information showing the copy screen 401.

(Status of "Job in Process 602")

If the information of job status shows the "job in process 602", the stop button 312 can issue the job stop instruction 606. The stop button 312 displays a word (e.g., "stop") indicating that a job in process is to be suspended. The start button 311 can issue the job start instruction 604. The start button 311 displays a word (e.g., "start") indicating that the job is to be started with the contents set by the user.

The example 1200C of FIG. 12 corresponds to the display states 1104, 1105 of FIG. 11. The display state 1104 corresponds to the case of the information of the job status indicating the "job in process 602" and the display screen information showing the home screen 302. The display state 1105 corresponds to the case of the information of the job status indicating the "job in process 602" and the display screen information showing the status check screen 800.

The example 1200D of FIG. 12 corresponds to the display state 1106 of FIG. 11. The display state 1106 corresponds to the case of the information of the job status indicating the "job in process 602" and the display screen information showing the copy screen 401.

(Status of "Job Suspended 603")

If the information of job status shows the "job suspended 603", the start button 311 can issue the job restart instruction 607. The start button 311 shows a word (e.g., "restart") indicating that a suspended job is to be restarted.

The job suspension screen 1000 is displayed in the cases corresponding to the display states 1108, 1109. The display state 1108 corresponds to the case of the information of the job status indicating the "job suspended 603" and the display screen information showing the status check screen 800. The display state 1109 corresponds to the case of the information of the job status indicating the "job suspended 603" and the display screen information showing the copy screen 401. The stop button 312 can issue the job stop instruction 606 of the job selected in the suspended job list 1001. The stop button 312 shows a word (e.g., "stop") indicating that a suspended job is to be stopped or cancelled. The stop button 312 is not displayed if the display screen information shows the home screen 302 (the display state 1107).

The example 1200E of FIG. 12 corresponds to the display states 1108, 1109 of FIG. 11 described above.

The example 1200F of FIG. 12 corresponds to the display state 1107 of FIG. 11 described above.

By changing the display and process to be executed of the start button 311 and stop button 312 shown in the common button display area 301 depending on the state of the MFP, the user can easily perform the job operations 604 to 607 when necessary.

Second Embodiment

Figure 13:
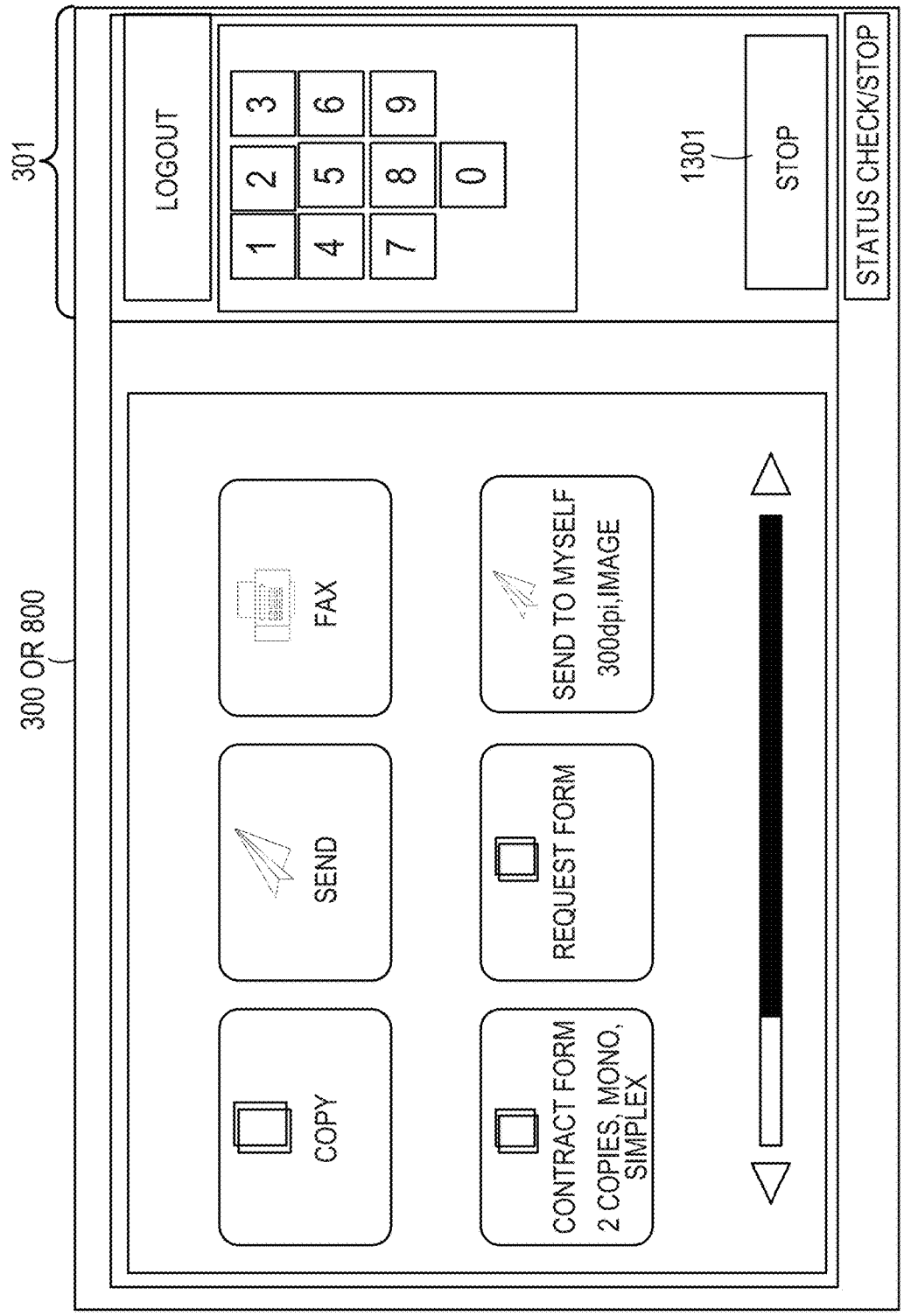
FIG. 13 shows an example of displaying the buttons according to another embodiment of the present disclosure (some buttons are not displayed).

FIG. 13 shows another example different from FIG. 12 if the start button 311 is not displayed. For example, if the information of the job status indicates the "job in process 602" and the display screen information shows the home screen 302 (the display state 1104), the form of the buttons is not limited to the example of 1200C. Similarly, if the information of the job status indicates the "job in process 602" and the display screen information shows the status check screen 800 (the display state 1105), the form of the buttons is not limited to the example of 1200C. According to the second embodiment, a stop button 1301 is formed by widening the stop button 312 in the common button display area 301.

(Display Controlling Process)

Figure 14:
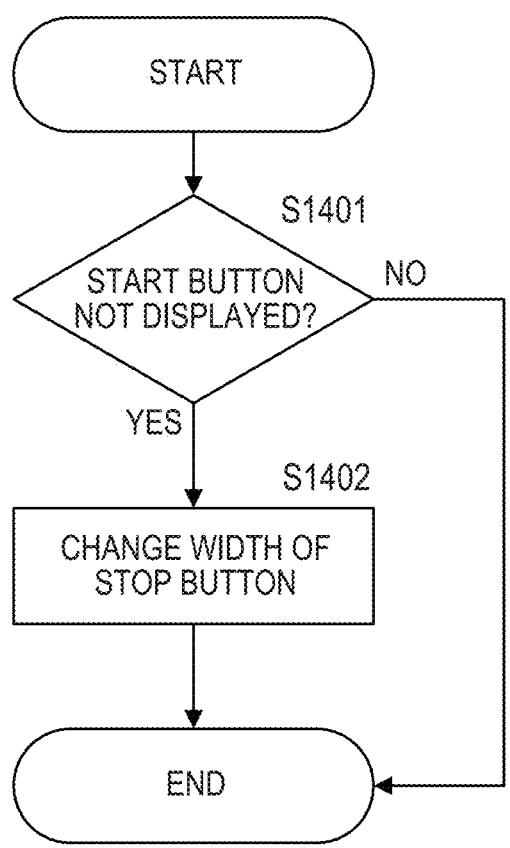
FIG. 14 is a flowchart describing the control for displaying the buttons according to another embodiment of the present disclosure.

FIG. 14 shows a flowchart for changing a width of the stop button 312 if the start button 311 is not displayed. The same process can be applied in case of changing a width of the start button 311 if the stop button 312 is not displayed.

In step S1401, the controller 125 determines whether the start button 311 is not displayed. If determined that the start button 311 is displayed (No in step S1401), the process ends, and if determined that the start button 311 is not displayed (Yes in S1401), the process proceeds to step S1402.

In step S1402, a size (width) of the stop button 312 is changed, and the process is ended.

In the present embodiment, a size of the stop button 312 is increased, so that the user can more easily operate the button.

Third Embodiment

Figure 15A:
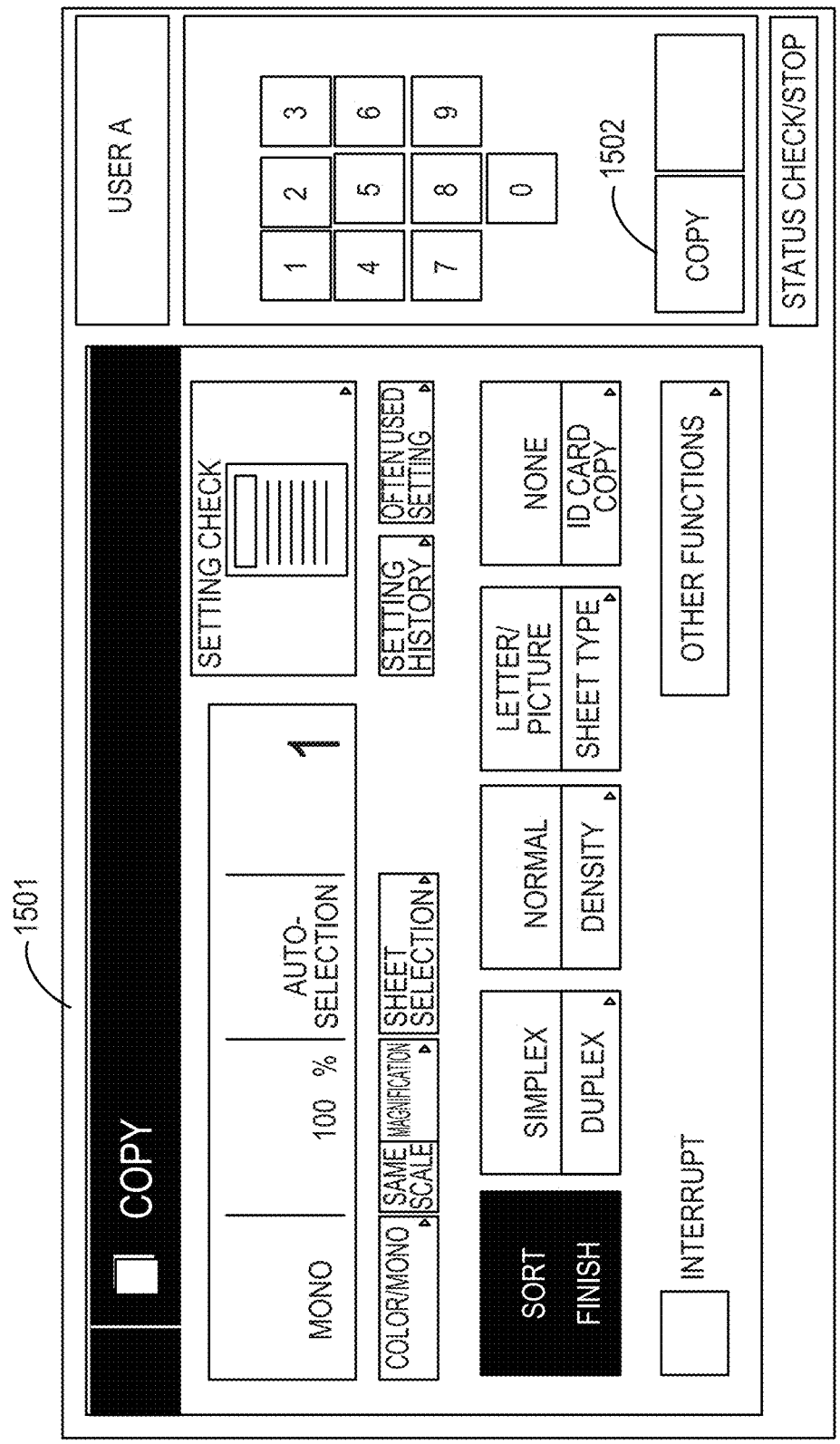
FIG. 15A shows another example of displaying the buttons according to another embodiment of the present disclosure.

FIG. 15A shows another example of the copy screen different from the copy screen 401 of FIG. 4 displayed in the application display area 300. According to the third embodiment, a copy screen 1501 includes a button 1502 as the start button 311, and the button 1502 shows a word "copy" that corresponds to the displayed application.

(Display Controlling Process)

Figure 16:
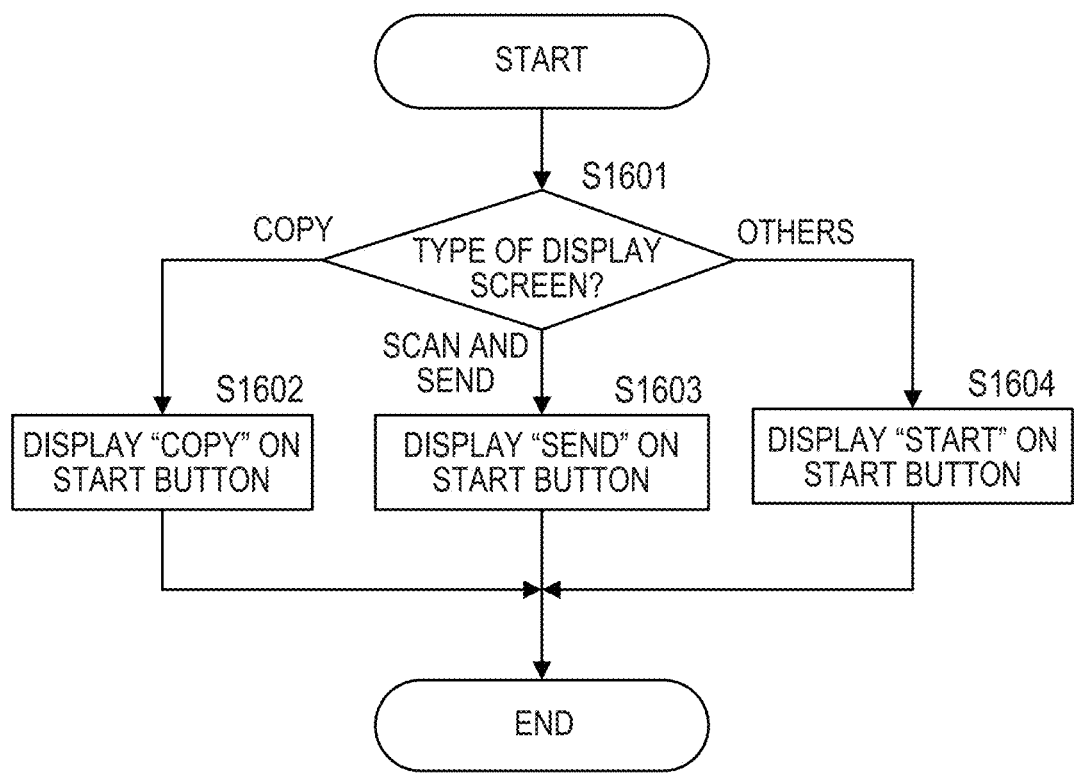
FIG. 16 is a flowchart describing the control for displaying the buttons according to another embodiment of the present disclosure.

FIG. 16 shows a flowchart for determining the word shown on the start button 311.

In step S1601, the CPU 101 of the controller 125 determines what is displayed on the screen.

If it is determined that the copy screen 401 is displayed, the process proceeds to step S1602. In step S1602, the start button 311 is changed to the button 1502 showing a word indicative of the start of the copy operation (e.g., "copy").

Figure 15B:
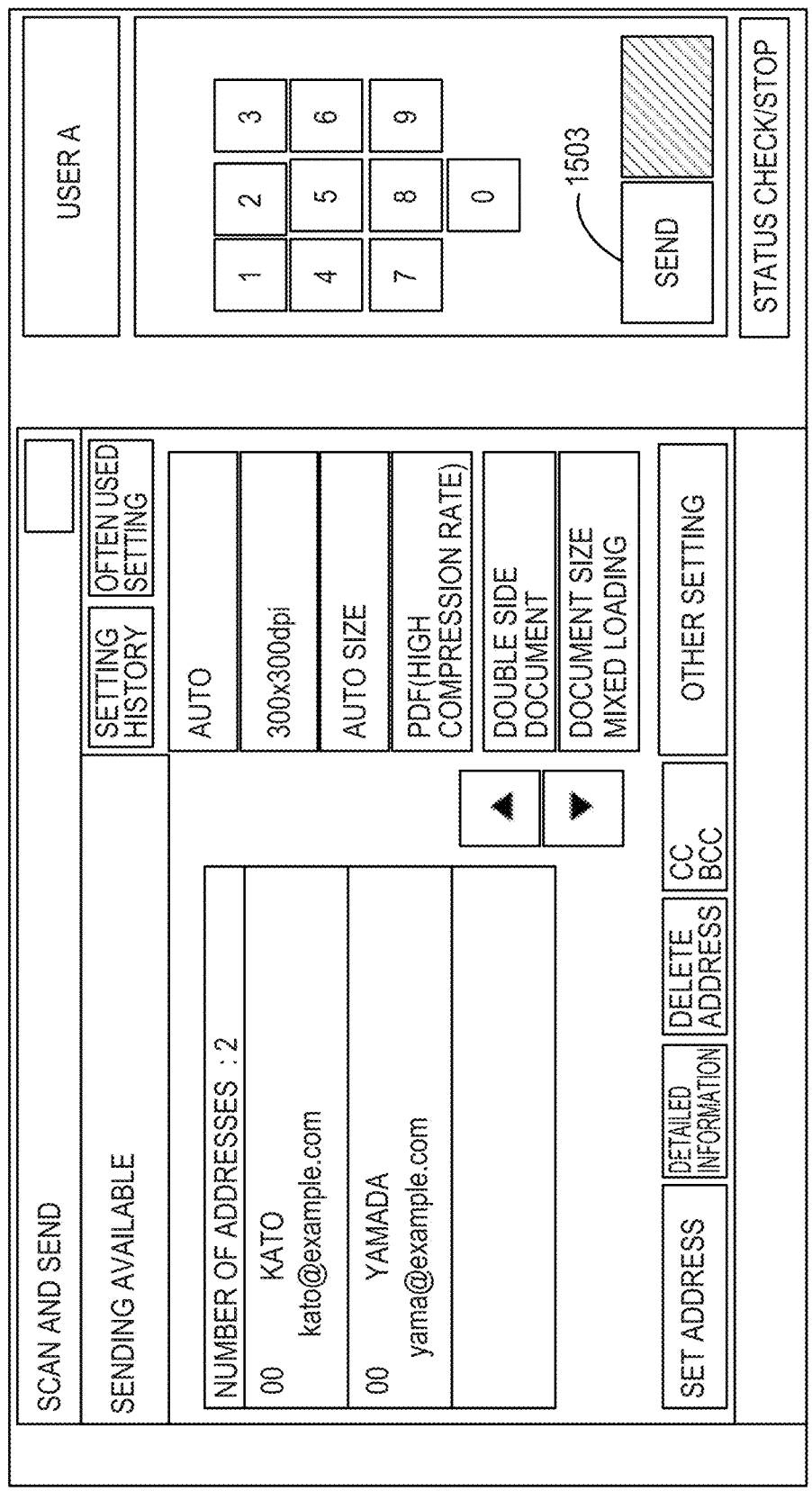
FIG. 15B shows another example of displaying the buttons according to another embodiment of the present disclosure.

Similarly, if it is determined that the screen for the "scan and send" application is displayed, the process proceeds to step S1603. In step S1603, the start button 311 is changed to a button 1503 showing a word indicative of the start of the sending operation (e.g., "send"). An example of displaying the button 1503 in step S1603 is shown in FIG. 15B. If it is determined that a screen other than the "copy" and "scan and send" applications is displayed, the process proceeds to step S1604. In step S1604, the start button 311 showing a word indicative of executing a job (e.g., "start") is displayed.

According to the third embodiment, the job start instruction 604 can be changed and displayed with a more descriptive word depending on applications for improved usability.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-142902, filed Sep. 2, 2021, which is hereby incorporated by reference herein in its entirety.

What is claimed is:

1. An information processing apparatus comprising:
a memory; and
at least one processor in communication with the memory and configured to perform:
  causing an operation unit to display a display screen, the display screen including first and second display areas, the first display area being able to display a home screen and a screen of application, the second display area being commonly used in each application, the home screen including first and second application buttons that receive instructions for starting up first and second applications, respectively, and the screen of application corresponding to an application button selected through the home screen;
  causing the operation unit to display a first screen in the second display area if a job is in process in the information processing apparatus and the home screen is displayed in the first display area, the first screen not allowing a user to use a start button for starting to execute a new job but allowing the user to use a stop button for stopping the job in process; and
  causing the operation unit to display a second screen in the second display area if a job is in process in the information processing apparatus and the screen of application is displayed in the first display area, the second screen allowing a user to use a start button for starting to execute a new job and a stop button for stopping the job in process.

2. The information processing apparatus according to claim 1, wherein the at least one processor further performs:
  causing the operation unit to display a screen in the second display area if a job is not in process in the information processing apparatus and the home screen is displayed in the first display area, the screen not allowing the user to use the start button for starting to execute a new job and the stop button for stopping the job in process; and
  causing the operation unit to display a screen in the second display area if a job is not in process in the information processing apparatus and the screen of application is displayed in the first display area, the screen allowing the user to use the start button for starting to execute a new job but not allowing the user to use the stop button for stopping the job in process.

3. The information processing apparatus according to claim 1, wherein the at least one processor further performs:
  causing the operation unit to display a screen in the second display area if a job is in suspension in the information processing apparatus and the home screen is displayed in the first display area, the screen allowing the user to give an instruction for resuming the suspended job but not allowing the user to use a stop button for stopping the suspended job; and
  causing the operation unit to display a screen in the second display area if a job is in suspension in the information processing apparatus and a status check screen is displayed in the first display area, the screen allowing the user to give an instruction for resuming the suspended job and allowing the user to use a stop button for stopping the suspended job.

4. The information processing apparatus according to claim 1, further comprising a printer unit that ejects sheets.

5. The information processing apparatus according to claim 1, wherein the first screen does not include the start button but includes the stop button.

6. The information processing apparatus according to claim 1, wherein the second screen includes the start button and the stop button.

7. The information processing apparatus according to claim 1, wherein the at least one processor further performs:
  causing the operation unit to display "copy" as a name of the start button for starting to execute a new job if a job is in process in the information processing apparatus and a screen of copy application is displayed in the first display area; and
  causing the operation unit to display "send" as a name of the start button for starting to execute a new job if a job is in process in the information processing apparatus and a screen of "scan and send" application is displayed in the first display area.

8. The information processing apparatus according to claim 1, wherein the first application is a copy application.

9. A method for controlling an information processing apparatus comprising:
  causing an operation unit of the information processing apparatus to display a display screen, the display screen including first and second display areas, the first display area being able to display a home screen and a screen of application, the second display area being commonly used in each application, the home screen including first and second application buttons that receive instructions for starting up first and second applications, respectively, and the screen of application corresponding to an application button selected through the home screen;

causing the operation unit to display a first screen in the second display area if a job is in process in the information processing apparatus and the home screen is displayed in the first display area, the first screen not allowing a user to use a start button for starting to execute a new job but allowing the user to use a stop button for stopping the job in process; and causing the operation unit to display a second screen in the second display area if a job is in process in the information processing apparatus and the screen of application is displayed in the first display area, the second screen allowing a user to use a start button for starting to execute a new job and a stop button for stopping the job in process.

10. The method according to claim 9, further comprising:

causing the operation unit to display a screen in the second display area if a job is not in process in the information processing apparatus and the home screen is displayed in the first display area, the screen not allowing the user to use the start button for starting to execute a new job and the stop button for stopping the job in process; and causing the operation unit to display a screen in the second display area if a job is not in process in the information processing apparatus and the screen of application is displayed in the first display area, the screen allowing the user to use the start button for starting to execute a new job but not allowing the user to use the stop button for stopping the job in process.

11. The method according to claim 9, further comprising:

causing the operation unit to display a screen in the second display area if a job is in suspension in the information processing apparatus and the home screen is displayed in the first display area, the screen allowing the user to give an instruction for resuming the suspended job but not allowing the user to use a stop button for stopping the suspended job; and causing the operation unit to display a screen in the second display area if a job is in suspension in the information processing apparatus and a status check screen is displayed in the first display area, the screen allowing the user to give an instruction for resuming the suspended job and allowing the user to use a stop button for stopping the suspended job.

12. The method according to claim 9, wherein the information processing apparatus comprises a printer unit that ejects sheets.

13. The method according to claim 9, wherein the first screen does not include the start button but includes the stop button.

14. The method according to claim 9, wherein the second screen includes the start button and the stop button.

15. The method according to claim 9, further comprising:

causing the operation unit to display "copy" as a name of the start button for starting to execute a new job if a job is in process in the information processing apparatus and a screen of copy application is displayed in the first display area; and causing the operation unit to display "send" as a name of the start button for starting to execute a new job if a job is in process in the information processing apparatus and a screen of "scan and send" application is displayed in the first display area.

16. The method according to claim 9, wherein the first application is a copy application.

\* \* \* \* \*